(12) United States Patent
Silfvast et al.

(10) Patent No.: US 11,501,760 B2
(45) Date of Patent: Nov. 15, 2022

(54) BONE CONDUCTION TRANSDUCERS FOR PRIVACY

(71) Applicant: Apple Inc., Cupertino, CA (US)

(72) Inventors: Robert D. Silfvast, Belmont, CA (US); Neal D. Evans, Sunnyvale, CA (US); Nikolas T. Vitt, Redwood City, CA (US); Jonathan D. Sheaffer, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/525,801

(22) Filed: Nov. 12, 2021

(65) Prior Publication Data

US 2022/0076662 A1 Mar. 10, 2022

Related U.S. Application Data

(63) Continuation of application No. 16/890,843, filed on Jun. 2, 2020, now Pat. No. 11,176,925.

(60) Provisional application No. 62/865,092, filed on Jun. 21, 2019.

(51) Int. Cl.
*G10L 15/08* (2006.01)
*H04L 9/40* (2022.01)
*H04R 1/10* (2006.01)

(52) U.S. Cl.
CPC ............ *G10L 15/083* (2013.01); *H04L 63/18* (2013.01); *H04R 1/1091* (2013.01); *G10L 2015/088* (2013.01); *H04R 2460/13* (2013.01)

(58) Field of Classification Search
CPC . G10L 15/083; G10L 2015/088; H04L 63/18; H04R 1/1091; H04R 2460/13
USPC .......................................................... 381/74
See application file for complete search history.

(56) References Cited

U.S. PATENT DOCUMENTS 9,939,661 B2    4/2018  Wei
10,631,075 B1*  4/2020  Patil ..................... H04R 1/1091

OTHER PUBLICATIONS

Notice of Allowance of the U.S. Patent Office dated Jul. 22, 2021 for related U.S. Appl. No. 16/890,843.

* cited by examiner

*Primary Examiner* — Paul Kim
(74) *Attorney, Agent, or Firm* — Womble Bond Dickinson (US) LLP

(57) ABSTRACT

A method for routing audio content through an electronic device that is to be worn by a user. The method obtains a communication and determines whether the communication is private. In response to determining that the communication is private, the method drives a bone conduction transducer of the electronic device with an audio signal associated with the communication. In response to determining that the communication is not private, however, the method drives a speaker of the electronic device with the audio signal.

20 Claims, 5 Drawing Sheets

__US 11,501,760 B2__

BONE CONDUCTION TRANSDUCERS FOR PRIVACY

CROSS-REFERENCE TO RELATED APPLICATIONS

This application is a continuation of pending U.S. application Ser. No. 16/890,843 filed Jun. 2, 2020, which claims the benefit of and priority to U.S. Provisional Patent Application No. 62/865,092, filed Jun. 21, 2019, which are hereby incorporated by this reference in their entirety.

FIELD

An aspect of the disclosure relates a computer system for routing audio content that is deemed to be private through a bone conduction transducer.

BACKGROUND

Headphones is an audio device that includes a pair of speakers, each of which is placed on top of a user's ear when the headphones are worn on or around the user's head. Similar to headphones, earphones (or in-ear headphones) are two separate audio devices, each having a speaker that is inserted into the user's ear. Headphones and earphones are normally wired to a separate playback device, such as a digital audio player, that drives each of the speakers of the devices with an audio signal in order to produce sound (e.g., music). Headphones and earphones provide a convenient method by which the user can individually listen to audio content without having to broadcast the audio content to others who are nearby. Sound produced by headphones, however, may leak into the ambient environment, broadcasting the audio content to others who are nearby.

SUMMARY

An aspect of the disclosure is a method performed by a computer system for determining how to route audio content of a communication through an electronic device, such as a pair of wireless open-back headphones that is to be worn by a user. The electronic device may include two or more channels, each of which route audio content differently. For instance, one channel may be a "private" channel, through which audio content is routed to a bone conduction transducer that outputs the audio as mechanical vibrations of the user's skull. Such vibrations may only heard by the user of the electronic device. In contrast, the electronic device may include another "non-private" channel, through which audio content is routed to at least one of the speakers of the open-back headphones that outputs sound into (or towards) an ear of a user. Sound produced by the speaker may be heard by not only the user of the electronic device, but also others that are within a close proximity (e.g., persons sitting next to the user of the electronic device), since sound produced by speakers of open-back headphones may leak out into the environment. The computer system obtains a communication, which may be a text message or an incoming telephone call, via a network. The computer system determines whether the communication is private. For example, the communication may explicitly indicate that its content is to be private (e.g., the sender of the communication tags the communication as being private). As another example, the computer system may determine that the communication is private based on an analysis of its audio content. For instance, the communication may contain words or phrases that are indicative of a private communication. In response to determining that the communication is private, the communication's audio content is outputted through the bone conduction transducer. If, however, the communication is determined to not be private, its audio content is instead outputted through the speakers.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The aspects of the disclosure are illustrated by way of example and not by way of limitation in the figures of the accompanying drawings in which like references indicate similar elements. It should be noted that references to "an" or "one" aspect of the disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Several aspects of the disclosure with reference to the appended drawings are now explained. Whenever the shapes, relative positions, and other aspects of the parts described in the aspects are not explicitly defined, the scope of the disclosure is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

Figure 1:
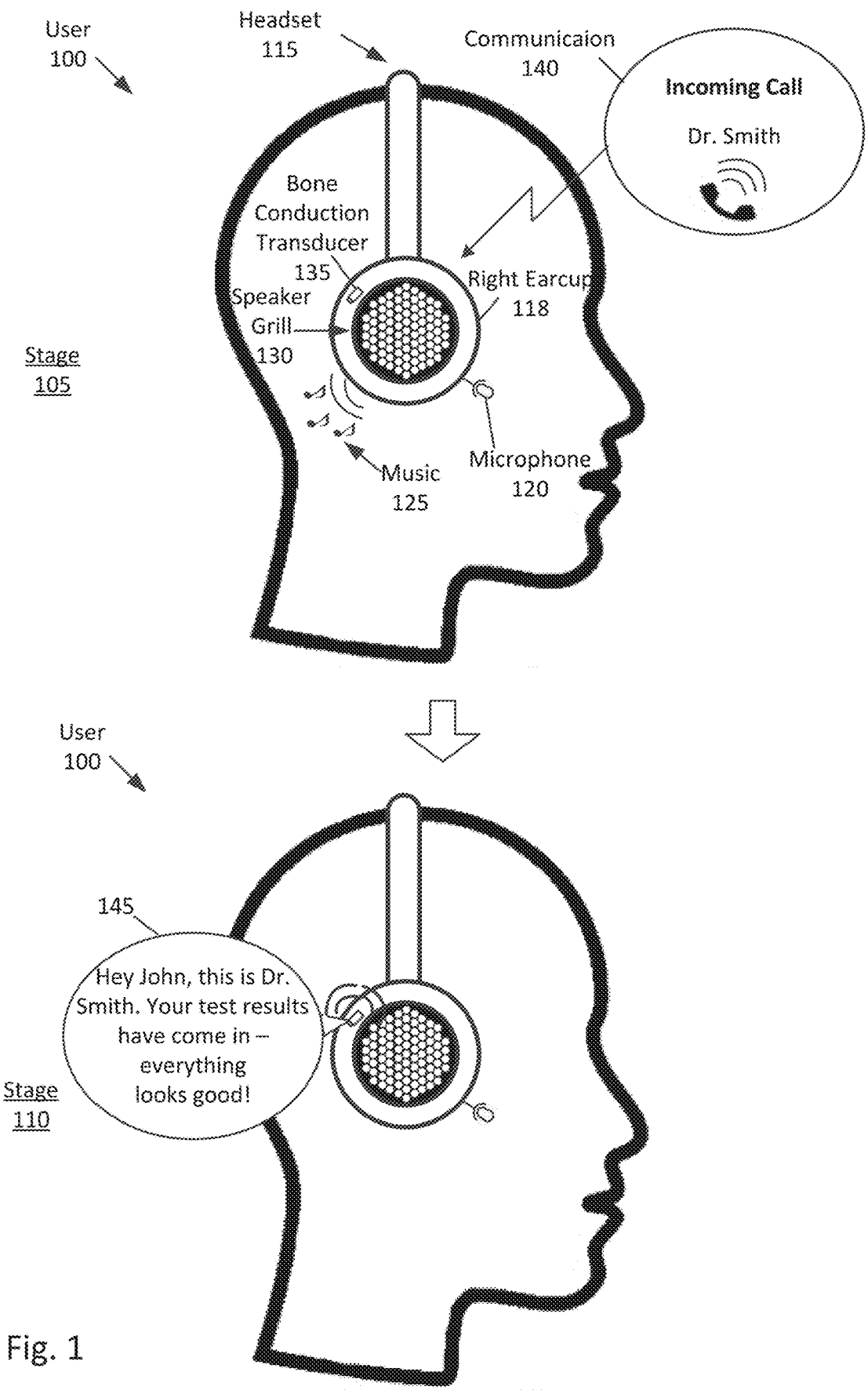
FIG. 1 shows a progression of stages of a headset receiving an incoming call that is routed to a bone conduction transducer.

FIG. 1 illustrates a user 100 wearing a headset 115 that routes a communication 140 to a bone conduction transducer (hereafter referred to as "BCT") 135, in response to determining that the communication is private. Specifically, this figure illustrates two stages 105 and 110 in which the headset 115 obtains the communication, determines that the communication 140 is private, and then drives the BCT 135 with an audio signal associated with the communication in order to output the communication, as for example vibrations.

The headset 115 illustrated in this figure is a pair of over-the-ear open-back headphones that allows some sound produced by at least one speaker of the headphones to leak into the environment via a speaker grill 130 and/or allows some ambient sounds from the environment to leak into the earcup 118 via the speaker grill 130 be heard by the user. In one aspect, the headset 115 may be any electronic device that includes at least one speaker and at least one BCT, and is capable of being worn by a user and capable of performing one or more audio processing operations. For instance, the headset 115 may be a pair of in-ear, on-ear, or over-the-ear headphones (open-back, closed-back, or semi-open headphones). In one aspect, the headset 115 is at least one earphone (e.g., earbud) that is configured to be inserted into an ear canal of the user. In one aspect, the headset 115 may also be any electronic device that is capable of performing networking operations. For instance, the headset 115 may be a wireless electronic device that is configured to establish a wireless connection with a media playback device (not shown), such as a smart phone, a tablet, a laptop, etc., over a wireless computer network, using e.g., BLUETOOTH protocol or a wireless area network. During the established wireless connection, the headset 115 may exchange (e.g., transmit and receive) data packets (e.g., Internet Protocol (IP) packets) with the media playback device. In one aspect, this wireless connection is pairing the headset 115 with the media playback device in order to allow the headset 115 to perform at least some operations that may otherwise be performed by the media playback device. For example, as described herein, the user 100 may participate in a handsfree phone call that is initiated by the media playback device, but conducted through the headset 115. In one aspect, the electronic device may be a wearable device, such as smart glasses or a smart watch.

As used herein, a "communication" may refer to an electronic message or signal (e.g., audio signal) that is obtained or exchanged, between the headset 115 and another electronic device. Examples of an electronic message may include an instant message, a personal message, a text message (e.g., short message server (SMS), multimedia message (MMS), etc.), an electronic mail, and a voice mail. In one aspect, the electronic message may include text, image data (which may include digital images and/or video), and/or an audio signal (e.g., as audio data). Another type of communication may include a telephone (e.g., voice) call in which an originating electronic device calls the headset 115 over a public switched telephone network (PSTN) and/or to a voice/data network (e.g., that supports voice-over-IP). In one aspect, the voice-data network may couple to the headset 115 over any type of computer network (e.g., local area networks, wireless area networks, etc.). In this case, the communication may be associated with an audio signal, such as a downlink signal during the phone call.

In one aspect, the communication may be obtained from a computer program (or application) that is being executed by at least one processor in the headset 115. In another aspect, the communication may be obtained from an application executing on another electronic (e.g., media playback) device that is paired with the headset 115. Specifically, the communication may be an indication or notification produced by an application that output of an audio signal is desired. For example, the communication may be produced by a messaging application to alert the user of a SMS message has been recently received. Such a communication may be associated with an audio signal containing speech of "A message has been received from Hal." As another example, the communication may be produced by a telephony application when a telephone call is being received. Specifically, the telephony application may produce the communication upon receiving a control signal from a voice network that a telephone call is to be received. Such a communication may be associated with an audio signal containing a ring tone and information regarding the call (e.g., telephone number). In one aspect, the communication may be an indication of an audible reminder that is to be outputted at a certain time by a calendar application. In one aspect, the communication is produced by a media playback application that indicates audio output, such as music, is desired.

In another aspect, the communication may be a virtual personal assistant ("VPA") response or alert from a VPA that is executing on the headset 115 and/or executing on another electronic device that is paired with the headset 115 (e.g., smart phone). For example, the response or alert may be issued by the VPA in response to a question from the user. In one example, the user may trigger the VPA by saying a trigger phrase (e.g., "Hey Hal") and then may ask the VPA a question (or issue a command), such as "what time is it?" In response, the VPA will generate (or produce) an audible response (e.g., "It is five o'clock.") to be included within (or associated with) the VPA response or alert. The audible response may be an audio signal that is rendered and outputted (or played back) by the headset 115.

In another aspect, and as described herein, the communication may be an audio signal. Specifically, rather than being an indication or notification that an audio signal is to be outputted, the communication may be the audio signal. Continuing with the previous examples, the audio signal may be the audio signal of the audible response from the VPA. In one aspect, the audio signal may include user-desired audio content, such as a musical composition.

As used herein, a communication is "private" when the user 100 of the headset 115 is the only person that is meant to view and/or hear the contents of the communication. An example of such a communication may be an electronic message from a family member or a doctor. As described herein, a communication may be determined to be private based on several factors, such as the content contained therein. Conversely, a communication is "non-private" when may be heard and/or viewed by others besides the user. An example of such a communication may be a virtual assistant alert relating to navigation instructions.

Figure 2:
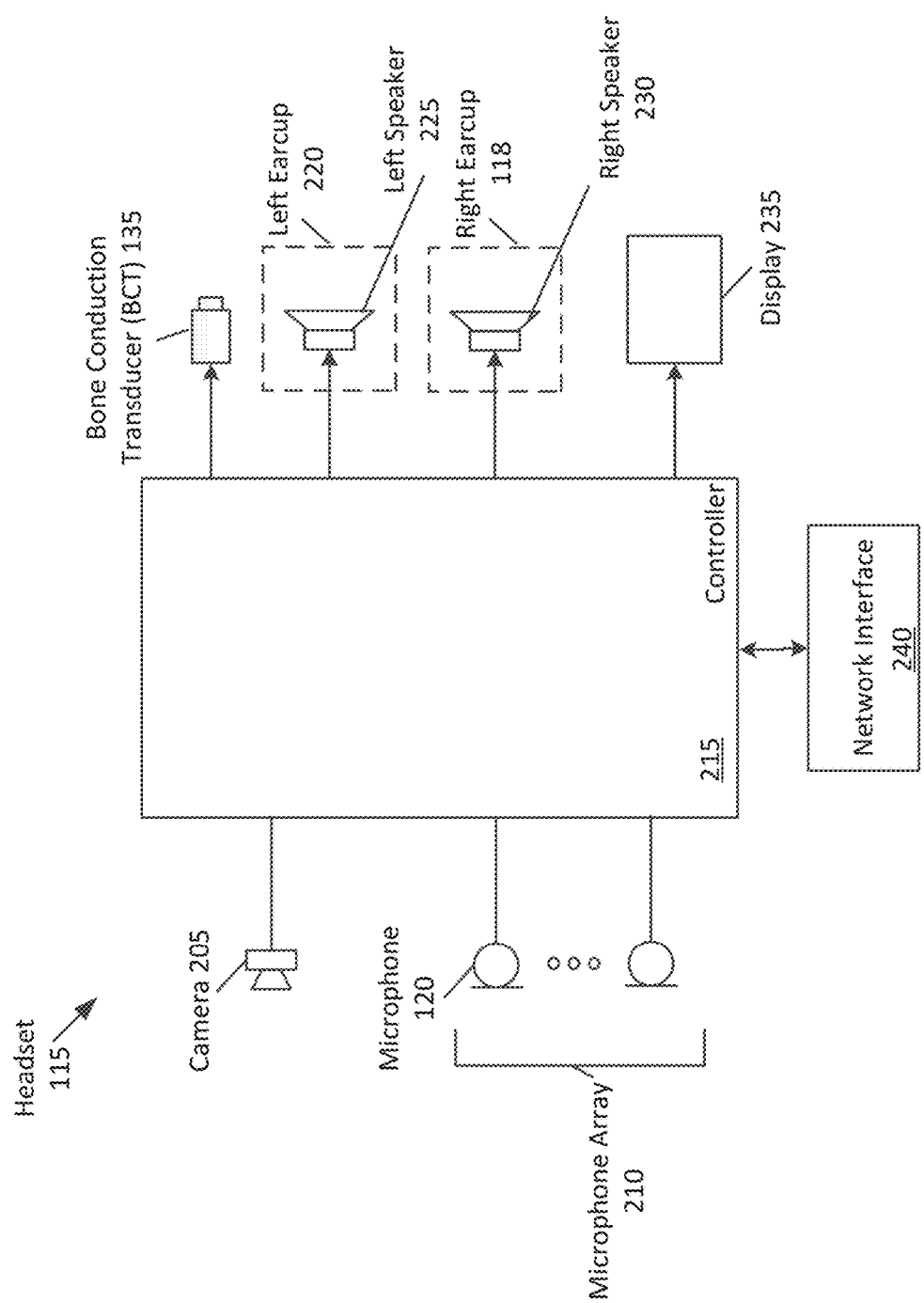
FIG. 2 shows a block diagram of the headset.

The headset 115 also includes a right earcup 118 that has a microphone 120, a BCT 135, and a speaker grill 130, behind which is at least one speaker (e.g., speaker 230 of FIG. 2). Specifically, the microphone 120 is configured to sense (or capture) sound (e.g., speech of the user 100) that is within the environment, and convert the sound into an audio signal (or microphone signal). The BCT 135 is positioned on a portion of the earcup 118 that rests upon (or abuts) at least a portion of the user's head. For instance, the BCT 135 is positioned inside a cushion of the earcup. The BCT 135 is configured to output an audio signal as mechanical vibrations of the user's head. In this figure, the BCT 135 abuts the mastoid process that is a portion of the temporal bone of a right side of the user's skull. The BCT 135 conducts sound to the inner ear of the user through vibrations that are picked up by the mastoid process of the skull. In one aspect, the left earcup (not shown) of the headset 115 may include the same number of elements described herein at similar locations (e.g., another BCT that abuts the mastoid process on a left side of the user's head).

In another aspect, the number of elements of the headset 115 may be different and/or may be positioned at different locations about the headset 115. For instance, the BCT 135 may be positioned differently on the headset 115 in order to come into contact with a different part of the user's head. As one example, the BCT may come into contact with the user's temporal bone, temporomandibular joint, mandible, etc.

As described herein, an audio signal associated with a communication may be outputted by the speakers (e.g., 230) and/or the BCT 135. In one aspect, however, the headset 115 may route an audio signal to (one or more of) the speakers in the open-back earcup by default, rather than to the BCT 135. Specifically, under most conditions, the headset 115 may route an audio signal to speaker 230. The default towards this speaker may be due to several factors. One factor may be that air conduction provides higher quality sound to a user than bone conduction. For example, bone conduction has a narrower frequency range than air conduction, which is due to bypassing most of the acoustic auditory processes and directly vibrating the user's cochlea. Furthermore, unlike bone conduction, air conduction may preserve spatial audio cues through the use of spatial filters, such as head related transfer functions (HRTFs) that account for diffraction and reflections of sound on parts of a user's body (e.g., head, pinnae, etc.). Thus, users in general may prefer air conduction since sound has a higher fidelity than bone conduction. In addition to reduced quality, bone conduction devices may be uncomfortable to wear for some users due to required head contact.

Although providing better sound quality than bone conduction, air conduction has drawbacks, such as "sound leakage," which is sound that is inadvertently heard by others within close proximity to the user 100 (e.g., a person sitting next to the user 100 at a restaurant). For instance, in the case of open-back headphones, the sound leakage may be sound that is audible (e.g., having a sound pressure level above 0 dBSPL), up to a threshold distance away from the user (or the user's ear). Sound leakage may also be compounded based on the volume level of the sound produced by the speaker in the earcup 118. Sound leakage for bone conduction, on the other hand, is a less significant problem. For instance, if audio content were to be played back through the BCT 135 and speaker 230 of the earcup 118 at similar playback levels, the speaker 230 would have more sound leakage than the BCT. In one aspect, sound leakage due to bone conduction may be virtually non-existent up to a volume level. Thus, even if there is sound leakage, the amount is far less than with air conduction and may not be perceived by others due to diffusion in the air.

The user 100 may want to avoid (substantial) sound leakage from air conduction under certain conditions. For example, this sound may be very distracting to others who are nearby, especially if the environment has little ambient sound, such as a library. Besides being distracting to others, the user 100 may want to avoid routing audio signals to the speaker of the earcup 118 when audio content of the audio signal is of a private nature (e.g., a phone call from doctor) in order to prevent others from eavesdropping, due to the sound leakage via the speaker grill 130. To prevent others from hearing this audio content, the headset 115 may route audio signals that are private to the BCT 135 in order to output the audio as vibrations that are only heard by the user 100. Those who are within a close proximity of the user 100, however, will be unable to (or are less likely to) decipher the audio outputted (or produced) by the BCT 135. Thus, the headset 115 is configured to route audio content that is determined to be private to the BCT 135, and route audio content that is determined to be non-private to the speaker 230 (and/or a speaker of a left earcup of the headset 115). More about how the headset 115 makes this determination is described herein.

Returning to FIG. 1, stage 105 illustrates the headset 115 playing back audio content (e.g., music) 125 through the speaker 230, and as a result, at least some of the music 125 is leaking out into the environment through the grill 130. In one aspect, the headset 115 may route audio signals containing the audio content to the speaker of the earcup 118 based on a determination that the content (or audio signal) is not private. This stage further illustrates that while the music 125 is playing back, the headset 115 receives (obtains) an incoming phone call 140 from Dr. Smith. Specifically, a telephony application executing on the headset 115 may be made aware of or may identify an incoming phone call by the operating system, OS, of the headset 115. For example, the OS may alert the telephony application of a telephony change at the headset 115 (e.g., receipt of a control signal from a cell tower that indicates an incoming call). In addition to identifying the incoming call, the telephony application may identify information regarding the incoming call, such as a telephone number of the originating device (e.g., through a caller-ID mechanism). From this information, the headset 115 may determine whether the incoming phone call is a private phone call in order to determine how to properly route the call. For instance, the headset 115 may compare the telephone number of the incoming phone call to entries of a contacts list stored within the headset 115, where each entry of the contacts list associates a phone number with a known person (e.g., a person whom the phone number belongs) to identify a matching entry. In one aspect, each entry may include additional user defined settings. For instance, the user of the headset 115 may designate that communications received (e.g., phone calls, electronic messages, etc.) from a phone number of an entry are deemed private, and are to be routed to the BCT 135. More about how the headset 115 determines how to route a communication is described herein.

Stage 110 illustrates that the phone call has been determined to be private (e.g., based on the user settings of a corresponding entry within the contacts list), and, in response, the headset 115 is routing the incoming call to the BCT 135. In one aspect, upon determining that the phone call is private, the headset 115 may present an indication or ringing alert to the user 100, indicating that there is an incoming call 140. For instance, the headset 115 may output a ring tone and/or may present a graphical user interface (GUI) on a display of the headset 115 (not shown). Upon the user 100 accepting the call (e.g., pressing a button or through a verbal command to answer the call), the headset 115 may obtain a downlink audio signal of the incoming call, and use the signal to drive the BCT 135 to produce vibrations. In one aspect, upon determining that the call is a private call, the headset 115 may route the ringing alert to the BCT 135, rather than (or in addition to) routing the alert to the speaker of the earcup 118. In one aspect, the headset 115 may automatically (e.g., without user interference) answer the incoming call. Thus, the headset 115 drives the BCT 135 with the downlink signal that contains speech 145 of Dr. Smith.

This stage also illustrates that upon routing the downlink audio signal, the headset 115 has ceased to output the music 125. For instance, in this case, the headset 115 may mute the music 125 to prevent the speaker of the earcup 118 from outputting all of the sound. In one aspect, rather than muting the music 125, the headset 115 may continue to output the music 125, while the user 100 engages in the phone call with Dr. Smith. In another aspect, the headset 115 may adjust sound output of the earcup's speaker(s), such as reducing sound output volume and/or reducing a portion of the spectral content of the music (e.g., applying a high-pass or band-pass filter). Once the user 100 terminates the phone call, the BCT 135 may cease to output the downlink audio signal, and the headset may resume playing back the music 125 through the speaker(s) of the earcup 118.

FIG. 2 shows a block diagram of the headset 115 according to one aspect of the disclosure. The headset 115 includes a camera 205, a microphone array 210 of two or more microphones 120, a BCT 135, a left earcup 220 with at least one speaker 225, the right earcup 118 with at least one speaker 230, a controller 215, at least one display screen 235, and a network interface 240. In one aspect, the headset 115 may include fewer elements, such as not having the display 235 and/or may include more elements, as described herein. In some aspects, at least some of these elements are integrated into a housing of the headset 115. In one aspect, the headset 115 may be a wireless device, as previously described. In one aspect, the network interface is configured to establish a wireless communication link with a wireless access point in order to exchange data with an electronic server over a wireless network (e.g., the Internet). In another aspect, the network interface 240 is configured to establish a wireless communication link (e.g., pair) with the other electronic device in order to exchange data.

In one aspect, the headset 115 may be a part of a computer system, as disclosed herein, that includes a separate media playback device, such as a smart phone, which is paired with the headset 115 by establishing a (e.g., wired and/or wireless) connection. In one aspect, the (e.g., programmed processor of the) media playback device may perform one or more of the operations described herein, such as audio/image processing operations. In another aspect, at least some of the elements of the headset 115 described herein (e.g., the BCT 135, the display 235, etc.) may be a part of different electronic devices within the computer system. In this case, the different electronic devices may communicate with the headset 115 and/or each other via a wireless or wired communication link. For example, rather than the headset 115 having two earcups 118 and 225, the headset may be wirelessly coupled (e.g., paired) with separate audio receiver devices that each includes at least one speaker (e.g., wireless earphones or earbuds). In this example, the headset 115 may exchange audio data with both these earphones in order for the speakers of the earphones to output sound.

In one aspect, the camera 205 is a complementary metal-oxide-semiconductor (CMOS) image sensor that is capable of capturing digital images as image data that represent a field of view of the camera 205, where the field of view includes a scene of an environment in which the headset 115 is located. In some aspects, the camera 205 may be a charged-coupled device (CCD) camera type. The camera 205 is configured to capture still digital images and/or video that is represented by a series of digital images. In one aspect, the camera is in a frontal position of the headset 115 with respect to a user. In another aspect, the camera may be positioned differently and/or there may be more than one camera. The BCT 135, as described herein, may be any type of electronic component that is configured to output an audio signal as mechanical vibrations. In one aspect, the headset 115 may include a driver amplifier (not shown) coupled to the BCT 135 that can receive an analog input from a respective digital to analog converter, where the later receives its input digital audio signal from the controller 215.

Each microphone 120 of the microphone array 210 may be any type of microphone (e.g., a differential pressure gradient micro-electromechanical system (MEMS) microphone) that is configured to convert acoustic energy caused by sound waves propagating in an acoustic environment into a microphone signal. Each speaker 225 and 230 of the earcups 220 and 118, respectively, may be an electrodynamic driver that may be specifically designed for sound output at certain frequency bands, such as a subwoofer, tweeter, or midrange driver, for example. In one aspect, the speakers may be a "full-range" (or "full-band") electrodynamic driver that reproduces as much of an audible frequency range as possible. Each speaker "outputs" or "plays back" audio by converting an analog or digital speaker driver signal into sound. In one aspect, the headset (or the earcups) includes a driver amplifier (not shown) for each speaker that can receive an analog input from a respective digital to analog converter, where the later receives its input digital audio signal from the controller 215.

The display screen 235, as described herein, is configured to display image and/or video data to the user of the headset 115. In one aspect, there may be one display. In another aspect, there may be at least one display for each eye of the user.

The controller 215 may be a special-purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines). The controller 215 is configured to determine whether a communication is private or non-private, and based on the determination to route an audio signal associated with the communication to an appropriate output (e.g., the BCT 135 or at least one of the speakers 225 and 230). More about how the controller makes this determination is described herein.

In one aspect, the controller 215 is configured to perform image processing operations upon digital images captured by the camera 205. Specifically, the controller 215 is configured to perform object recognition (e.g., through the use of an object recognition algorithm) upon the digital images (image data) in order to detect objects that are captured within the field of view of the camera 205. For example, the controller 215 may process the digital images to identify patterns therein (e.g., structural patterns) and compare them to previously stored patterns therein. Once a matching pattern is found, the controller 215 is said to detect the object within the digital image. In one aspect, the previously stored patterns do not need to match exactly to the identified patterns within the digital images. For instance, the patterns may match within a tolerance (e.g., 5%, 10%, 15%, etc.).

In another aspect, the controller 215 is further configured to receive microphone signals from at least some of the microphones 120 of the microphone array 210, to perform audio processing operations thereon. Specifically, the controller 215 may include a sound pickup beamformer that can be configured to process the microphone signals to form directional beam patterns for spatially selective sound pickup in certain directions, so as to be more sensitive to one or more sound source locations. For example, referring to FIG. 1, a microphone array may direct a beam pattern towards the user's mouth in order capture the user's speech, while minimizing undesired sounds and noises within the environment.

In one aspect, the controller is further configured to process input audio for outputting through one or more of the headset's speakers. For example, the controller 215 is to receive an input audio signal (channel) of a piece of sound program content to be rendered by the controller and drive at least one speaker with the input audio signal to output audio content contained within the signal, such as the music 125 being played back in FIG. 1. In one aspect, the controller may receive the input audio signal from a programmed processor that is running a media player application program. Alternatively, there may be more than one input audio channel, such as a two-channel input, namely left and right channels of a stereophonic recording of a musical work, or there may be more than two input audio channels, such as for example the entire audio sound track in 5.1-surround format. In one aspect, when there are multiple input audio channels, they may be downmixed to produce a signal downmixed audio channel. In one aspect, the controller 215 is configured to spatially render an input audio signal by applying spatial filters (e.g., head-related transfer functions (HRTFs)) to produce at least one binaural signal for each earcup. In one aspect, the HRTFs may be personalized for the user of the headset 115 in order to account for the user's anthropometrics.

In one aspect, the controller 215 is configured to perform speech recognition (e.g., through the use of a speech recognition algorithm) to analyze an audio signal to find (or recognize) speech therein. Specifically, the controller may analyze audio data of the audio signal according to the speech recognition algorithm to identify a word or phrase contained therein. In one aspect, the controller may perform speech recognition upon text to identify a word or phrase. In another aspect, the controller 215 is further configured to perform a text-to-speech (TTS) algorithm to produce a synthesized speech version of text. Specifically, the TTS algorithm produces an audio signal that includes speech of the text, which as described herein may be obtained in a communication, such as an electronic message. Alternatively, the audio signal containing the speech may be retrieved as previously recorded human speech from a remote electronic server, via a computer network.

In some aspects, the headset 115 may include additional elements. For instance, the headset 115 may include one or more "extra-aural" speakers that may be arranged on the headset 115 (e.g., on the right earcup 118) to project (or output) sound directly into the environment. This is in contrast to the speakers of in-ear, on-ear, or over-ear headphones, such as speakers 225 and 230 that produce sound directly into a respective ear of the user 100 (and may leak sound into the environment). In one aspect, headset 115 may include an array of (two or more) extra-aural speakers that are configured to project directional beam patterns of sound at locations within the environment. In some aspects, the controller 215 may include a sound output beamformer that is configured to produce speaker driver signals which when used to drive the two or more extra-aural speakers, may produce spatially selective sound output.

Figure 3:
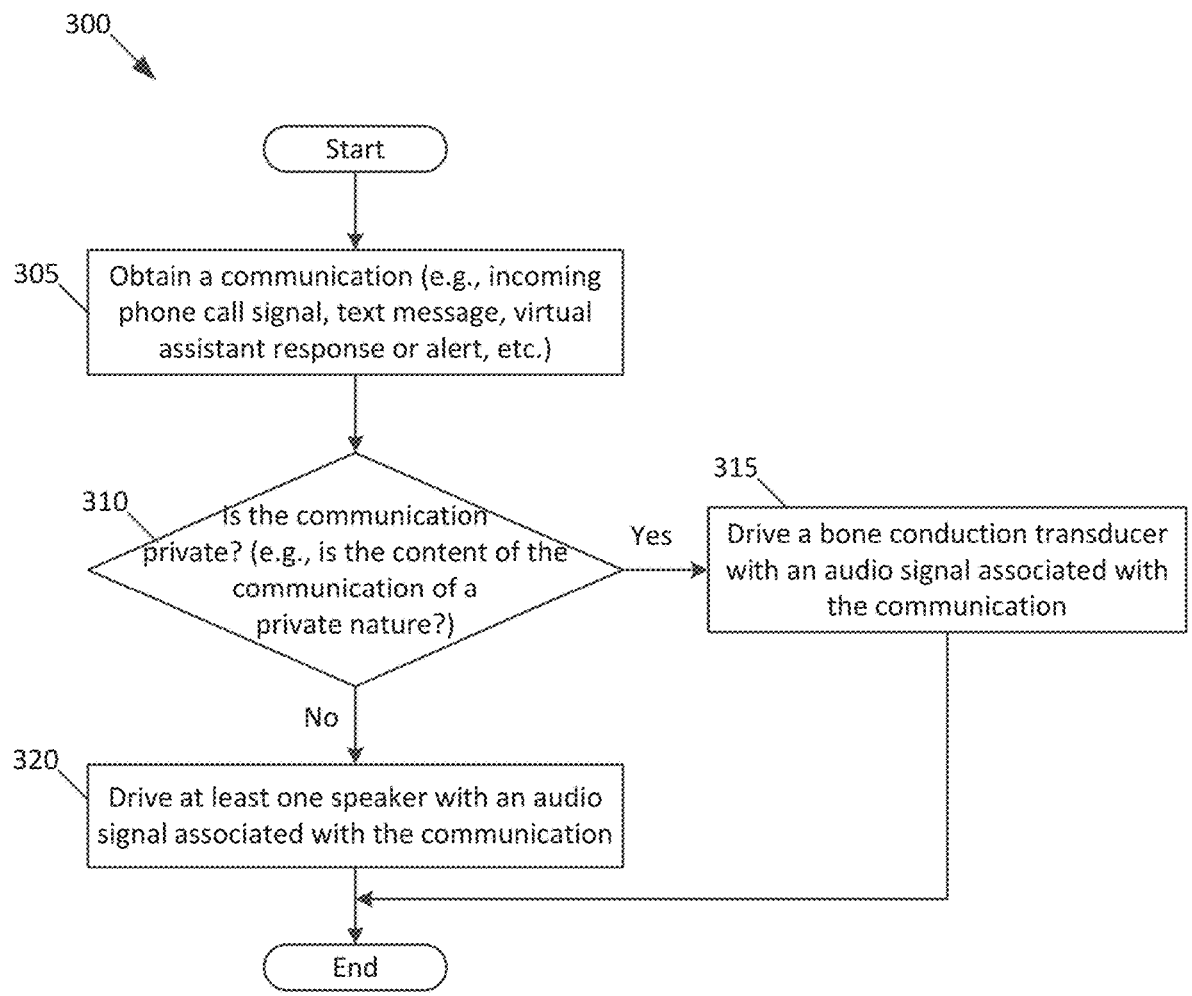
FIG. 3 is a flowchart of one aspect of a process to route a communication to either a bone conduction transducer or a speaker of the headset.

FIG. 3 is a flowchart of one aspect of a process 300 to route a communication to at least one of a bone conduction transducer or a speaker. In one aspect, the process 300 may be performed by the controller 215 that is operating in the headset 115, as described in FIG. 2. In FIG. 3, process 300 begins by obtaining a communication (at block 305). As described herein, a communication may be one of an electronic message, such as a SMS message, a virtual assistant response or alert, and/or an audio signal, such as an incoming phone call (downlink) signal. In one aspect, the communication may be a control signal indicating that the headset 115 is receiving the incoming call. In one aspect, the communication may be obtained via a network from another electronic device. In one aspect, the communication may be an indication or notification that output of an audio signal is desired. For instance, the controller 215 may receive an indication (e.g., a request) from an application running locally on the headset 115 to output audio, such as an audible reminder from a calendar application. In another aspect, the indication may be associated with an audio signal containing audio content to alert the user of the headset that a communication has been (or is being) received. The process 300 determines whether the communication is private (at decision block 310). Specifically, the controller 215 may make this determination based on at least one of several factors. For example, the controller 215 may designate the communication as private based on the origin of the communication, such as a telephone number of an incoming call as described in FIG. 1. As another example, the controller may analyze the content of the communication to identify indications of privacy, such as predefined words in a SMS message or the audio signal that is associated (or obtained along) with the communication. When the communication is an audio signal, the controller may determine whether the audio signal is to be private based on identified metadata associated with the audio signal that indicates whether or not the audio signal should be private. More about how the controller 215 makes this determination is described in FIGS. 4-5.

In response to determining that the communication is private, the process 300 drives the BCT 135 of the headset 115 with an audio signal associated with the communication (at block 315). For example, when the communication includes an audio signal (or is an audio signal) containing audio data (e.g., a voicemail, a downlink audio signal of an incoming call, user-desired content, etc.), the controller routes the audio signal to the BCT 135 based on (e.g., an analysis of) the audio data. If, however, the communication includes text, the controller 215 may convert the text to a speech signal (e.g., using the TTS algorithm described herein), and route the speech signal to the BCT. In response, however, to determining that the communication is not private, the process 300 drives at least one speaker 225 and/or 230 with the audio signal associated with the communication (at block 320). In one aspect, the controller may drive the BCT with a different signal than one used to drive either (or both of) the speakers in the earcups of the headset for a communication. For instance, since each speaker may have a fuller spectral range than the BCT, an audio signal used to drive each speaker may include more spectral content than a signal used to drive the BCT. In another aspect, the different signals may include different (or similar) portions of a communication.

Figure 4:
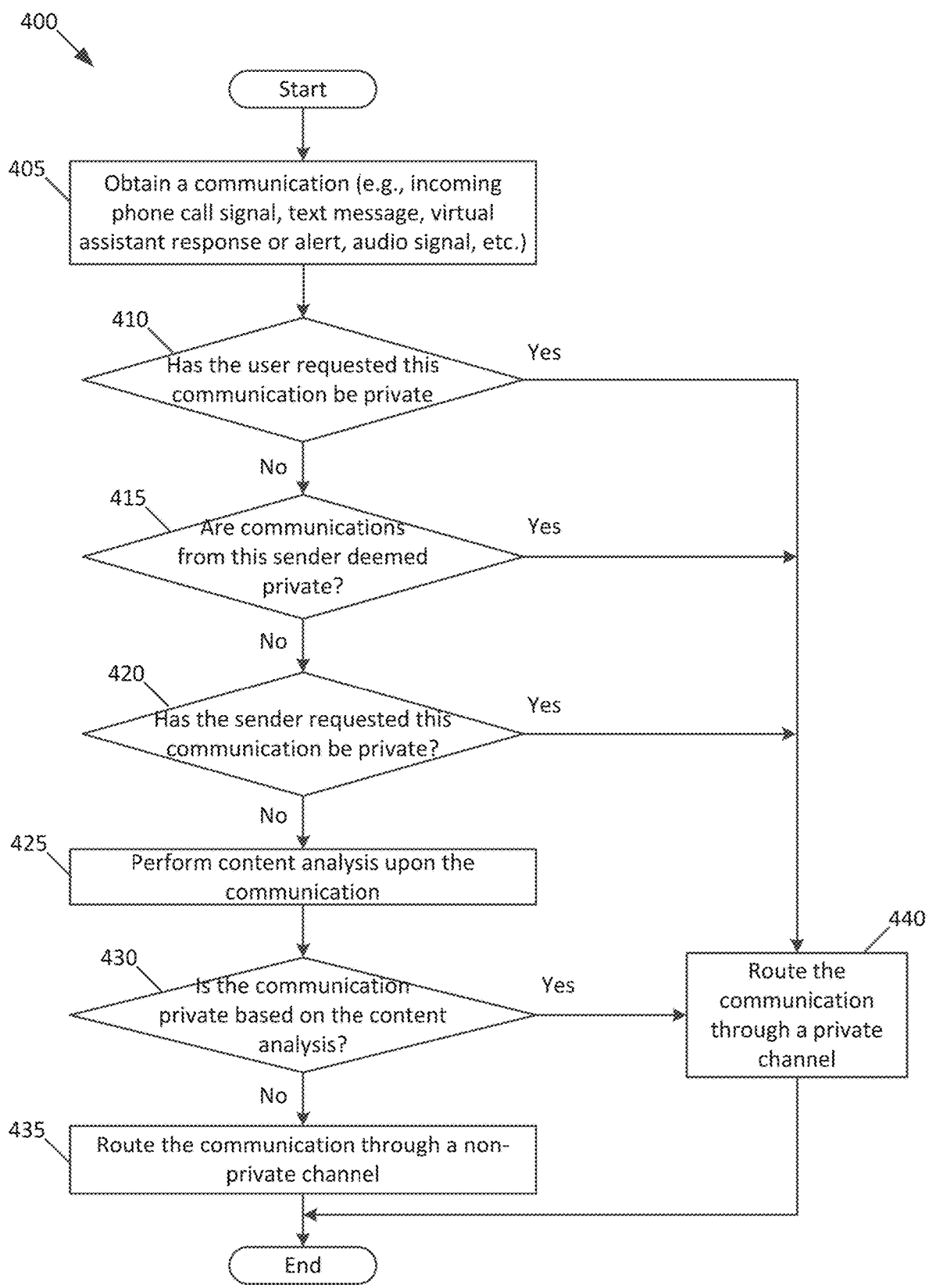
FIG. 4 is a flowchart of one aspect of a process to determine whether a communication is private or non-private.

FIG. 4 is a flowchart of one aspect of a process 400 to determine whether a communication is private or non-private. In one aspect, this process 400 is performed by the controller 215 of FIG. 2. The process 400 begins by obtaining a communication (at block 405). For instance, the communication may have been obtained by the headset 115, via the network interface 240 over a computer network, from another electronic device for example. The process 400 determines if the user of the headset has requested (or instructed) that the obtained communication be private (at decision block 410). Specifically, the headset may alert the user that the communication has been obtained in order to determine how the user may want to route the communication. Specifically, upon obtaining the communication, the headset may present an alert message to the user. For example, the headset may drive at least one speaker 225 and 230 to output an audible alert, for example in the case of a text message, the controller 215 may output speech through the speakers indicating "Message received from Dr. Smith". In one aspect, the headset may present a visual alert through the display 235.

In one aspect, the user of the headset 115 may instruct the controller 215 to route the communication to the BCT 135 through a user command. For example, the user may issue a verbal command that is captured by a microphone 120, and recognized as a command through the speech recognition algorithm, described herein. As another example, the user may select a physical button on the headset 115, or a UI item (e.g., an item which when pressed routes the communication to the BCT 135) on a touchscreen display (e.g., either the display 235 or an external display that is accessible to the user) of the headset 115 or of a device paired with the headset, such as a smartphone.

In another aspect, the controller 215 may monitor for physical gestures of the user that are indicative of an instruction to route the communication to the BCT 135. For example, the controller 215 may monitor sensor data from sensors integrated into the headset 115 and/or sensors that are integrated into electronic devices that are electrically coupled to the headset 115. For instance, the sensors may include proximity sensors, motion sensors, microphones, etc.). As an example, a proximity sensor may be positioned next to the user's ear. Upon determining that an object is within a threshold distance of the sensor according to the proximity sensor data, the controller may determine that the user is covering the ear. Such a gesture may be indicative of a desire to route the communication to the BCT. In one aspect, the controller may identify the instruction when the proximity sensor data from the proximity sensor indicates that an object is positioned over the ear, and remains there for a period of time (e.g., five seconds).

If the user requests that the communication be private, the process 400 routes the communication through a private channel (at block 440). Specifically, the controller 215 may drive the BCT 135 with an audio signal associated with the communication, as described herein. In one aspect, the audio signal may be a part of the communication. In another aspect, the audio signal may be generated (or produced) from the communication from another audio signal (or audio data) contained within the communication. As another example, the audio signal may be a speech signal produced using a TTS algorithm upon text included within the communication, as described in FIG. 2.

In another aspect, the private channel may be (or include) a display channel. Specifically, the communication may be presented on the display screen 235 of the headset 115, as text, image, and/or video data of the communication. If, however, the communication includes an audio signal, the controller 215 may perform a speech-to-text algorithm to convert the signal to words in order to present the words on the display screen. In some aspects, the controller may output the communication to both the BCT and the display screen. In another aspect, the controller 215 may output different portions of a communication through the BCT and the display screen (e.g., in the case of an audio/video communication, the audio may be outputted through the BCT 135 and the video may be presented by the display screen 235).

If, however, the user of the headset 115 does not request that the communication be deemed private the process 400 determines whether communications from a sender of the communication are deemed (or defined previously) as private (at decision block 415). In one aspect, the controller 215 may wait for instructions from the user of the headset for a threshold of time (e.g., five seconds) after alerting the user of the obtained communication. If no instructions are received, however, the controller 215 may proceed to decision block 415. Specifically, as described in FIG. 1, the controller may base the determination at decision block 415 according to user settings stored within the headset (and/or the computer system in which the headset is a part of). For example, the settings may be a part of entries of a contacts list stored in memory of the headset 115. Communications may be associated with the sender through identifying information (e.g., metadata) that is contained therein. For instance, the metadata may indicate the sender's name, telephone number, user account name, email address, etc. Similar information may be stored within the contacts list that is used to identify known senders. The controller compares the metadata of the obtained communication with identifying information of the entries in the contacts list to identify a matching entry. Once the matching entry is found, the controller determines the sender of the communication. The controller 215 determines whether the communication is private based on the user defined settings associated with the sender's matching entry in the list that indicate the communication is private. In one aspect, the user defined settings may indicate that all types of communications (e.g., telephone calls, electronic messages, etc.) from this sender are deemed private. In another aspect, the settings may differentiate between the types of communications. For example, the settings may indicate that telephone calls from a sender are private, while electronic messages from the same sender are non-private.

In one aspect, the settings may be user defined or learned over time. For example, a user of the headset 115 may define a private setting through a graphical user interface (GUI) on a display of the headset (or an electronic device paired with the headset 115, such as a smartphone). The user may navigate to an entry in the contacts list associated with the sender and interact with a user interface (UI) switch in which the user may toggle between "private" and "non-private". In another aspect, the settings may be defined through machine learning algorithms that monitor user instructions when communications are received from this particular sender. For instance, if the user continuously (e.g., more than once) provides instructions to route communications from this sender to the BCT 135, this may be an indication that the user of the headset wants future communications from this sender to be routed in a similar fashion. As a result, the headset 115 may automatically (e.g., without user intervention) adjust user settings to indicate that communications form this sender art to be deemed private.

If communications from this sender are deemed private, the process 400 proceeds to block 440 to route the communication through the private channel. If, however, communications from this sender are not deemed private, the process 400 determines if the sender has requested this communication be private (at decision block 420). Specifically, the controller 215 may analyze the metadata contained within the communication to determine is the sender has tagged (or included a request that) the communication be designated as private. In one aspect, the sender may have tagged the communication before sending it to the headset 115 (e.g., through a selection of a UI item). If the communication includes such a tag or request, the process 400 proceeds to block 440.

If, however, the sender has not requested the communication be private, the process 400 performs content analysis upon the communication (at block 425). For example, the controller 215 may analyze the (e.g., text, audio data, etc. of the) communication according to a speech recognition algorithm, as described herein, to identify a word or phrase contained therein. As another example, when the communication includes image data or video data, the controller 215 may perform object recognition, as described herein, to identify an object contained therein. As another example, when the communication is an audio signal, the controller 215 may analyze the content of the audio signal and/or any metadata associated with the audio signal. The process 400 determines if the communication is private based on the content analysis (at decision block 430). For instance, the controller 215 may determine if identified words and/or phrases are defined as private. Specifically, the controller 215 may perform a table lookup into a data structure that includes words and phrases that are deemed private. If a matching word or phrase is found within the data structure, the process 400 may proceed to block 440. As an example, the communication may be a text message that starts with "I have a secret to tell you," where the term "secret" indicates that the rest (or whole) communication is meant to be private. In one aspect, the sender may include an explicit indication that the communication is private, such as writing in the beginning of a text message "This is private." In one aspect, a similar table lookup may be performed with respect to identified objects. As another example, when the communication is an audio signal, metadata identified to be associated with the audio signal may indicate the audio signal is private, or may indicate that the audio signal includes inappropriate content. If the controller 215 determines that the audio signal is to be designated as private according to the metadata, the process proceeds to block 440.

Otherwise, if the communication is not private based on the content analysis, the process 400 routes the communication through a non-private channel by driving one or more of the speakers 225 and/or 230 with the audio signal associated with the communication (at block 435).

Some aspects perform variations of the process 400. For example, the specific operations of the process 400 may not be performed in the exact order shown and described. The specific operations may not be performed in one continuous series of operations and different specific operations may be performed in different aspects. For example, in one aspect, the process 400 may omit the operations described in block 410. As a result, the controller 215 may perform these operations automatically (e.g., without user intervention). In another aspect, if at any operations described herein it is determined that the communication is deemed to be non-private, the process 400 may proceed to block 435. For instance, if communications from this sender are deemed to be non-private based on user settings at decision block 415 and/or the sender has requested the communication to be non-private at block 420, the process 400 would route the communication to one or more of the speakers of the headset 115.

In some aspects, the process 400 may be performed to determine whether a notification of a communication is to be deemed private or non-private, rather than the communication itself. For instance, the process 400 may be performed with respect to whether to route a ring tone of an incoming phone call through the private or non-private channel. Once routed, the user may than accept the call (or message), and in response, the headset 115 may route the communication through the same channel as the channel used to route the notification.

In some aspects, the controller 215 may route audio content (e.g., music, etc.) other than communications through the BCT 135. Some audio content may be known to be better suited to be routed through the private channel. An example of such audio content may be a translation of text that the user of the headset 115 wants translated from a language that the user does not know to a familiar language. For instance, a translation application executing on the headset may produce a speech signal from text, where the speech signal is in a different language from the text. The controller 215 may than obtain the speech signal from the translation application and route the speech signal to the private channel. In one aspect, the determination of whether to route such audio to the private or non-private channel is according to the application that provided the audio. In one aspect, the controller 215 may determine that certain audio content be routed to the BCT 135 through machine learning, as described herein.

In one aspect, the headset 115 may reroute an audio signal that is currently being outputted through either the speakers of the headset and/or the BCT 135 upon determining that an obtained communication is private (or non-private). For example, the headset may determine that an audio signal associated with a communication is to be routed through the non-private channel, and thus drives at least one of the speakers of the headset with the audio signal. While outputting the audio signal, the controller 215 may determine that the user of the headset is performing a physical gesture in order to reroute the audio signal through the private channel. For instance, the controller 215 may identify that the user has placed at least one hand over the user's right ear based on image data captured by the camera 205. As a result, the controller 215 may cease driving the speaker(s) of the headset, and begin driving the BCT 135 with the audio signal. In one aspect, once the user performs the opposite gesture (e.g., removing the hand from the ear), the controller 215 may revert the audio signal back through the speaker(s).

Figure 5:
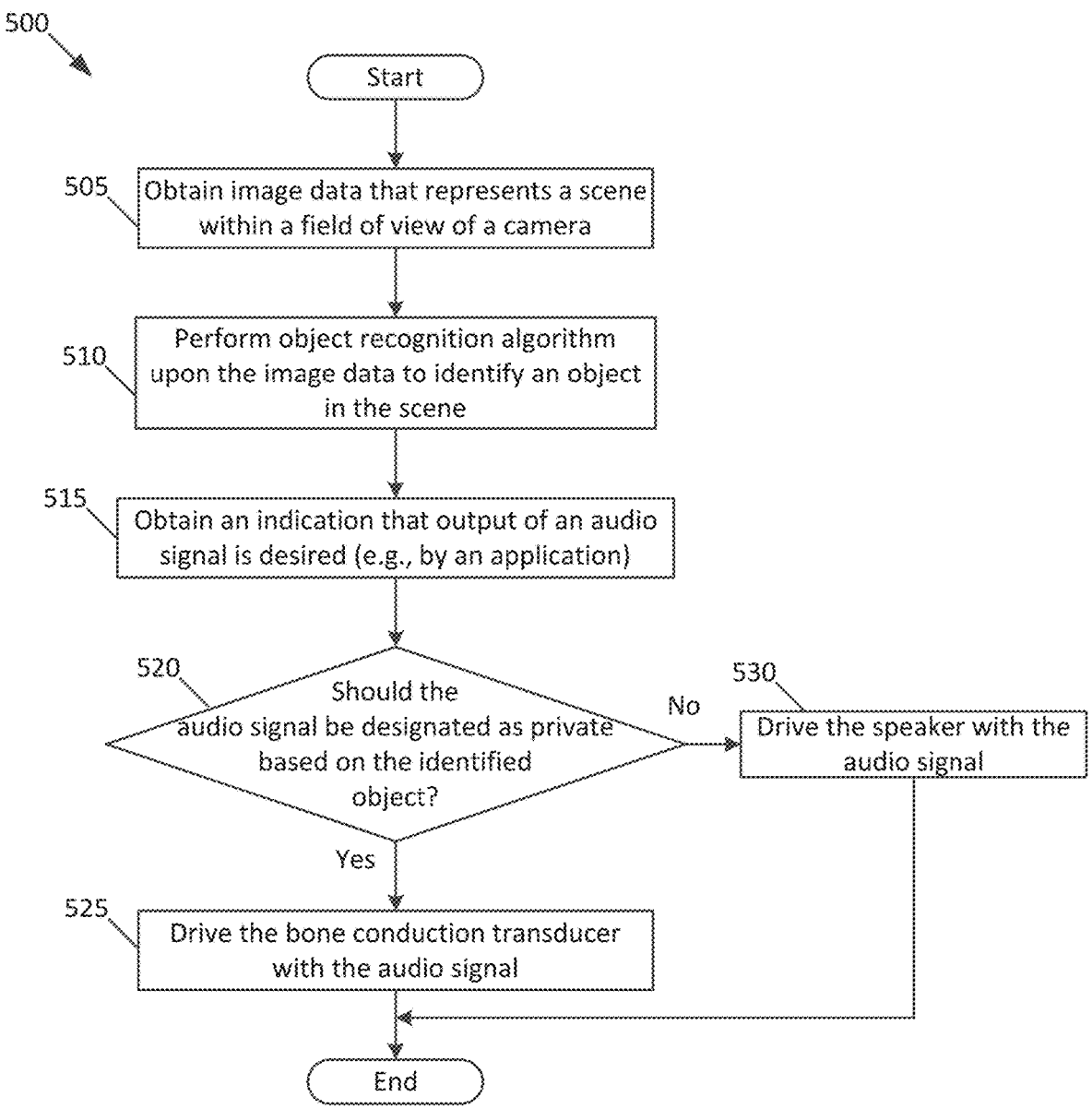
FIG. 5 is a flowchart of one aspect of a process to route an audio signal to either a bone conduction transducer or a speaker.

FIG. 5 is a flowchart of one aspect of a process 500 to route an audio signal to either a BCT 135 or at least one speaker of the headset (e.g., left speaker 225 and/or right speaker 230) based on identified objects within an environment in which the headset is located. In one aspect, the process 500 is performed by the (e.g., controller 215 of the) headset 115, as described in FIG. 2. The process 500 begins by obtaining image data from the camera 205 that represents a scene within a field of view of the camera (at block 505). The process 500 performs the object recognition algorithm, described herein, upon the image data to identify an object contained within scene (at block 510).

The process 500 obtains an indication that output of an audio signal is desired (at block 515). In one aspect, as described herein, the indication may be obtained from an application that is being executed by a processor of the headset. For instance, the indication may be obtained from a media playback application, when output of an audio signal containing audio content, such as music, is desired for playback. Such desire may be based on user input. In another aspect, the indication may indicate that a communication has been obtained, as described herein. The process 500 determines if the audio signal should be designated as private based on the identified object (at decision block 520). In one aspect, the controller 215 performs this operation in response to obtaining the indication. The controller 215 determines if the identified object is a known object that indicates audio signals should be designated as private, and therefore be used to drive the BCT 135 in order to output audio content contained therein. Such objects may indicate that the user of the headset 115 is not in (or is approaching) a public area, where playing back audio through speakers is not preferable. For example, these objects may include signs that indicate the user of the headset is entering a quiet location, or a location that audio/video recorded is taking place. The identified object may be a location that is identified as not being private, such as a library or a movie theater.

In one aspect, the audio signals may be designated as private upon determining that there are people within the field of view of the camera. For example, the identified object may be another person, or specifically the face or facial features of the person, such as eyes. Identifying another person's eyes within the field of view of the camera may represent that the person is looking at the user of the headset 115 because the person can hear the sound being produced by the speaker(s) of the headset. As a result, the audio signals may be designated private. As another example, the audio signals may be designated as private when the identified object is a physical gesture that indicates the audio signal should private. An example of a physical gesture includes identifying that a person is putting an index finger vertically across the person's lips. In one aspect, the physical gestures may be the same or similar to the physical gestures described in FIG. 4. Upon determining that the audio signal should be designated as private based on the identified object, the process 500 drives the BCT 135 with the audio signal (at block 525). Otherwise, the controller 215 drives the speaker(s) of the headset 115 with the audio signal (at block 530).

In one aspect, the determination at decision block 520 may be based on additional characteristics of the identified objects. For example, the determination may be based on whether the identified object is within the field of view of the camera 205 for a threshold period of time (e.g., five seconds). As an example, in the case in which the object is another person's eyes, the controller 215 may designate the audio signal as private, when the other person's eyes are within the field of view of the camera 205 for at least the threshold time, which indicates that the person is staring at the user. In another aspect, the determination may be based on a distance between the user of the headset 115 and the identified object. Specifically, when the identified object is a person, the audio signal may be designated as private when the person is within a threshold distance from the headset. This distance may be determined through the use of computer vision triangulation in which the position of the identified object is determined, given its projections onto two or more digital images captured by the camera 205, relative to the headset's known location and/or orientation when the images were captured. In one aspect, the user of the headset 115 may manually enter the location of the identified object (e.g., through a user interface of the headset). In other aspects, the controller 215 may determine the distance of the identified object through any known methods. In one aspect, the threshold distance may be adjustable and based on the output sound level of the speakers of the headset. For example, if the sound level is high, the distance may increase, while if the sound level is low, the distance may decrease. In one aspect, the threshold distance may be predefined and determined in a controlled environment.

In one aspect, the determination of whether to route the audio signal to the BCT or the speaker may be based on physical gestures identified within image data captured by the camera. Specifically, the controller 215 may identify a specific gesture performed by the user according to object recognition. For instance, image data captured by the camera 205 may include hand gestures of the user of the headset 115, such as a placing of the user's hand over the user's ear. Upon identifying the hand gesture, the controller 215 may drive the BCT with the audio signal.

In another aspect, the determination to route (or reroute) an audio signal to the BCT 135 may be based on ambient sound within the environment in which the headset 115 is located. The controller 215 may obtain microphone signals from the microphones 210 that capture ambient sound. The controller may compare the sound level of the ambient sound to a threshold value. If the sound level of the ambient sound is above a threshold value, meaning that the environment is very noisy, the controller 215 may route the audio signal to the BCT 135 in order for the user to hear the audio signal. Otherwise, if outputted through at least one of the speakers of the headset, the signal to noise ratio may be degraded because of the noisy environment, thereby making the audio signal indistinguishable from the ambient sound.

Some aspects perform variations of the process 500 described in FIG. 5. For example, specific operations of this process may not be performed in the exact order shown and described, and/or specific operations may be omitted entirely. In one aspect, the controller 215 may drive the BCT 135, so long as the identified object is within the field of view of the camera 205. For instance, at a first instance in time, the controller 215 may drive the BCT with an audio signal based on an identified object (e.g., a "Please No Talking" sign). At a second instance in time, after the first instance in time, additional image data that represents the scene may be obtained. Upon determining that the identified object is no longer within the scene according a performance of the object recognition algorithm upon the additional image data, the process 500 may cease driving the BCT 135 and drive at least one of the speakers of the headset with the audio signal to output audio content contained therein as sound. Conversely, if an audio signal is being used to drive at least one of the speakers of the headset 115 at a first instance in time, and it is determined that the audio signal is to be designated as private at a second instance in time (e.g., in response to identifying an object contained within image data, the controller 215 may cease driving the speaker and drive the BCT 135 using the audio signal.

In some aspects, audio content may be outputted through both the BCT 135 and at least one of the speakers of the headset 115. For example, an audio signal may be outputted through both at the same time in order for the user to get a fully audio experience. In one aspect, different audio signals of the same (or similar) audio content may be outputted through both. For instance, the controller 215 may analyze an audio signal and extract different portions to be outputted through either one of the speakers or the BCT 135. In the case of an audio signal including speech, the controller 215 may drive the speakers 225 and 230 to output ambient content of the audio signal, and drive the BCT 135 to output the speech. Thus, the speech remains private, while the ambient content may be heard by others in a close proximity to the user.

In one aspect, the indication obtained at block 515 may be based on the objected that is identified within the scene. Specifically, upon identification of an object, such as a person, the headset may obtain an indication that output of an audio signal associated with the identified object is desired. For example, the audio signal may include content describing physical attributes and/or identification information of the person. For instance, the audio signal may indicate the name of the person, what clothes the person is wearing, etc. As another example, when the identified object is an inanimate object, such as a sign, the audio signal may describe attributes of the object (e.g., in the case of a sign, the audio signal may contain speech describing words on the sign, the position of the sign with respect to the user, etc.). Audio signal associated with describing such attributes and/or information may be designated as private, since such information may be only important to the user, and not anyone else around the user. As yet another example, reminders, such as calendar reminders associated with an identified object may be designated as private.

An aspect of the disclosure may be a non-transitory machine-readable medium (such as microelectronic memory) having stored thereon instructions, which program one or more data processing components (generically referred to here as a "processor") to perform the network operations and signal processing operations (e.g., audio processing operations and image processing operations). In other aspects, some of these operations might be performed by specific hardware components that contain hardwired logic. Those operations might alternatively be performed by any combination of programmed data processing components and fixed hardwired circuit components.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

Personal information that is to be used should follow practices and privacy policies that are normally recognized as meeting (and/or exceeding) governmental and/or industry requirements to maintain privacy of users. For instance, any information should be managed so as to reduce risks of unauthorized or unintentional access or use, and the users should be informed clearly of the nature of any authorized use.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method comprising:
   obtaining image data captured by a camera of an electronic device that represents a scene within a field of view of the camera;
   performing an object recognition algorithm upon the image data to identify an object within the scene;
   obtaining an indication that output of an audio signal is desired;
   in response to obtaining the indication, determining whether the audio signal is to be designated as private according to the object; and
   driving a bone conduction transducer (BCT) of the electronic device with the audio signal when the audio signal is designated as private.

2. The method of claim 1 further comprising driving, at a first instance in time, a speaker of the electronic device with the audio signal,
   wherein determining whether the audio signal is to be designated as private is at a second instance in time, after the first instance in time,
   wherein driving the BCT with the audio signal comprises ceasing to drive the speaker with the audio signal.

3. The method of claim 1, wherein driving the BCT with the audio signal is at a first instance in time, wherein the method further comprises
   determining, at a second instance in time, after the first instance in time that the object is no longer within the scene according to the object recognition algorithm; and
   in response to determining that the object is no longer within the scene,
      ceasing to drive the BCT, and
      beginning to drive a speaker of the electronic device with the audio signal.

4. The method of claim 1, wherein the object comprises a person within the scene, wherein determining whether the audio signal is to be designated as private comprises determining that the person is within a threshold distance from the electronic device.

5. The method of claim 4, wherein audio signal comprises audio content describing at least one of physical attributes and identification information of the person.

6. The method of claim 4, wherein determining whether the audio signal is to be designated as private further comprises determining that the person in the scene is within the field of view of the camera for a threshold period of time.

7. The method of claim 1, wherein the audio signal is a first audio signal, wherein the method further comprises
   receiving a piece of sound program content;
   extracting a first portion of the piece of sound program content as the first audio signal and a second portion of the piece of sound program content as a second audio signal; and
   driving a speaker of the electronic device with the second audio signal while driving the BCT with the first audio signal.

8. The method of claim 7, wherein the first audio signal includes speech and the second audio signal includes ambient sound content of the piece of sound program content.

9. A headset comprising:
   a camera;
   a bone conduction transducer (BCT);
   a processor; and
   memory having stored therein instructions which when executed by the processor cause the headset to:
      obtain image data captured by the camera that represents a scene within a field of view of the camera;
      perform an object recognition algorithm upon the image data to identify an object within the scene;
      obtain an indication that output of an audio signal is desired;
      in response to obtaining the indication, determine whether the audio signal is to be designated as private according to the object; and
      drive the BCT with the audio signal when the audio signal is designated as private.

10. The headset of claim 9 further comprises a speaker, wherein the instructions further comprise instructions to drive, at a first instance in time, the speaker with the audio signal,
    wherein the instructions to determine whether the audio signal is to be designated as private is at a second instance in time, after the first instance in time, wherein the instructions to drive the BCT with the audio signal comprises instructions to cease driving the speaker with the audio signal.

11. The headset of claim 9 further comprises a speaker, wherein the instructions to drive the BCT with the audio signal is at a first instance in time, wherein the memory has further instructions to:
determine, at a second instance in time, after the first instance in time that the object is no longer within the scene according to the object recognition algorithm; and
in response to determining that the object is no longer within the scene,
cease to drive the BCT; and
begin to drive the speaker with the audio signal.

12. The headset of claim 9, wherein the object comprises a person within the scene, wherein the instructions to determine whether the audio signal is to be designated as private comprises instructions to determine that the person is within a threshold distance from the electronic device.

13. The headset of claim 12, wherein the audio signal comprises audio content describing at least one of physical attributes and identification information of the person.

14. The headset of claim 12, wherein the instructions to determine whether the audio signal is to be designated as private further comprises instructions to determine that the person in the scene is within the field of view of the camera for a threshold period of time.

15. A non-transitory machine-readable medium having instructions which when executed by a processor of an electronic device obtain image data captured by a camera that represents a scene within a field of view of the camera;
perform an object recognition algorithm upon the image data to identify an object within the scene;
obtain an indication that output of an audio signal is desired;
in response to obtaining the indication, determine whether the audio signal is to be designated as private according to the object; and
drive a bone conduction transducer (BCT) of the electronic device with the audio signal when the audio signal is designated as private.

16. The non-transitory machine-readable medium of claim 15 further comprises instructions to drive, at a first instance in time, a speaker of the electronic device with the audio signal,
wherein the instructions to determine whether the audio signal is to be designated as private is at a second instance in time, after the first instance in time,
wherein the instructions to drive the BCT with the audio signal comprises instructions to cease driving the speaker with the audio signal.

17. The non-transitory machine-readable medium of claim 15, wherein the instructions to drive the BCT with the audio signal is at a first instance in time, wherein the medium has further instructions to:
determine, at a second instance in time, after the first instance in time that the object is no longer within the scene according to the object recognition algorithm; and
in response to determining that the object is no longer within the scene,
cease to drive the BCT; and
begin to drive a speaker of the electronic device with the audio signal.

18. The non-transitory machine-readable medium of claim 15, wherein the object comprises a person within the scene, wherein the instructions to determine whether the audio signal is to be designated as private comprises instructions to determine that the person is within a threshold distance from the electronic device.

19. The non-transitory machine-readable medium of claim 18, wherein the audio signal comprises audio content describing at least one of physical attributes and identification information of the person.

20. The non-transitory machine-readable medium of claim 18, wherein the instructions to determine whether the audio signal is to be designated as private further comprises instructions to determine that the person in the scene is within the field of view of the camera for a threshold period of time.

* * * * *